United States Patent [19]

Itoh et al.

[11] Patent Number: 5,844,224

[45] Date of Patent: *Dec. 1, 1998

[54] ELECTRONIC APPARATUS AND METHOD OF CONTROLLING ELECTRONIC APPARATUS

[75] Inventors: Motohiko Itoh; Shinichi Satoh; Hiroaki Kawai; Ichiro Shinoda; Mitsuo Watanabe, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 702,320

[22] Filed: Aug. 23, 1996

[30] Foreign Application Priority Data

Feb. 26, 1996 [JP] Japan ................................. 8-038361

[51] Int. Cl.$^6$ .................................................. G06K 7/10
[52] U.S. Cl. ............................................ 235/462; 235/455
[58] Field of Search .................................... 235/455, 462

[56] References Cited

U.S. PATENT DOCUMENTS

| | | | |
|---|---|---|---|
| 4,356,389 | 10/1982 | Quirey et al. ............................ | 235/455 |
| 5,260,553 | 11/1993 | Rockstein et al. ....................... | 235/455 |
| 5,280,162 | 1/1994 | Marwin ................................... | 235/455 |
| 5,321,245 | 6/1994 | Kazumi .................................... | 235/455 |
| 5,382,782 | 1/1995 | Hasegawa et al. ...................... | 235/455 |
| 5,550,362 | 8/1996 | Sherman ................................. | 235/455 |
| 5,581,071 | 12/1996 | Chen et al. ............................. | 235/455 |
| 5,612,524 | 3/1997 | Coleman .................................. | 235/455 |

FOREIGN PATENT DOCUMENTS

| | | |
|---|---|---|
| 2 119 087 | 11/1983 | United Kingdom . |
| 2 221 298 | 1/1990 | United Kingdom . |
| 2 266 141 | 10/1993 | United Kingdom . |

OTHER PUBLICATIONS

British Patent Office communication for application No. GB 9617126.9, including search report, dated Oct. 18, 1996.

Primary Examiner—Harold Pitts
Attorney, Agent, or Firm—Armstrong, Westerman, Hattori, McLeland & Naughton

[57] ABSTRACT

An electronic apparatus having a plurality of states, and including a detection mechanism for detecting an external light and outputting a detection signal indicative of an intensity of the external light, a transition mechanism for making a state transition from a first state to a second state which is different from the first state and vice versa depending on the detection signal, and a varying mechanism for varying a light detection sensitivity of the detection mechanism depending on the detection signal when the state transition is made by the transition mechanism.

7 Claims, 6 Drawing Sheets

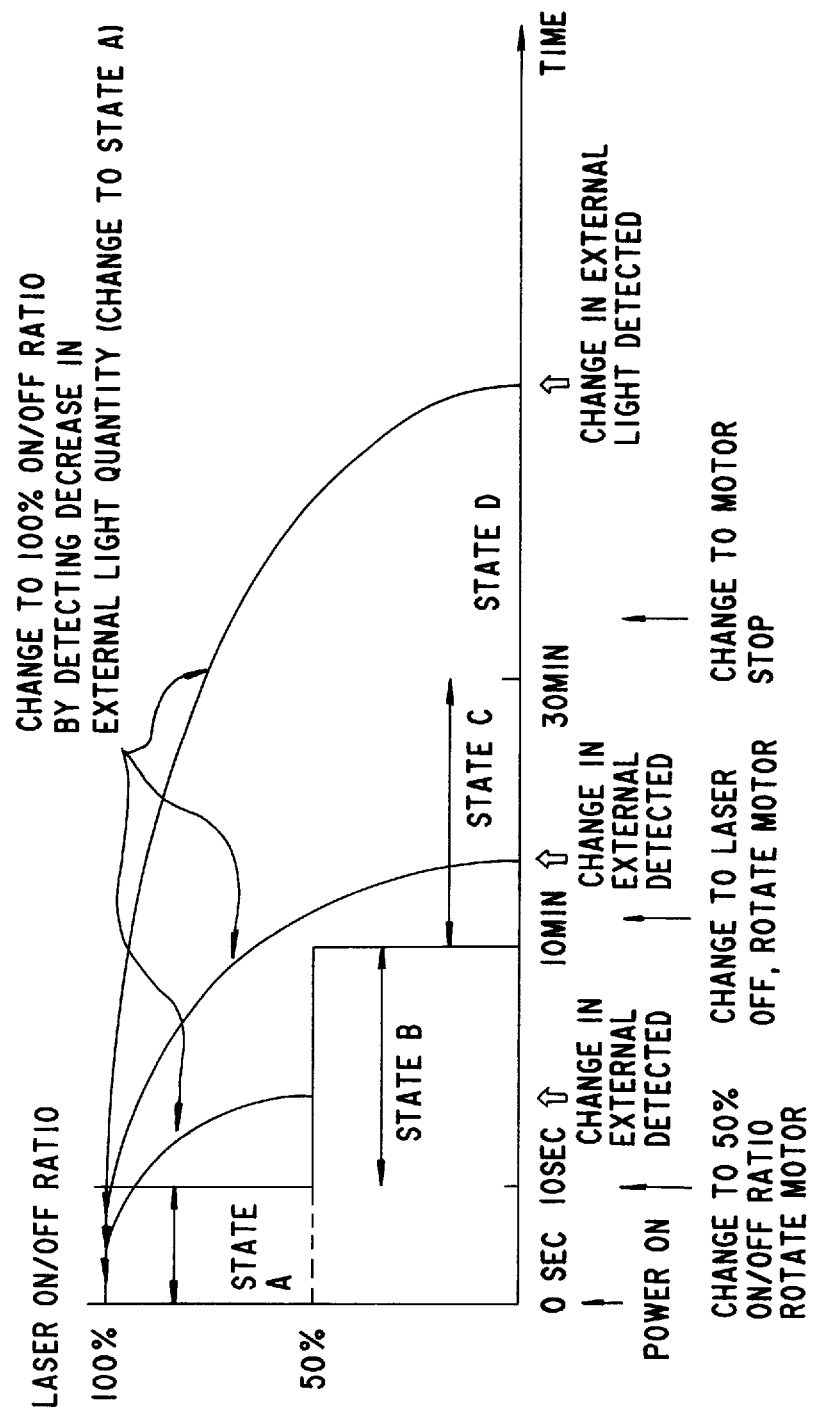

ELECTRONIC APPARATUS AND METHOD OF CONTROLLING ELECTRONIC APPARATUS

BACKGROUND OF THE INVENTION

The present invention generally relates to electronic apparatuses and methods of controlling electronic apparatuses, and more particularly to an electronic apparatus such as a bar code reader and to a method of controlling such an electronic apparatus which has a function of making a state transition depending on external light.

A laser type bar code reader reads a bar code by irradiating a laser scanning light on the bar code and detecting reflected light from the bar code. In the bar code reader, the laser light emitted from a laser diode is irradiated on a scanning means such as a polygonal mirror which is rotated by a motor, and the reflected laser light from the polygonal mirror scans in a plurality of directions. The reflected laser light, that is, the laser scanning light, is emitted to the outside via a read window.

The laser scanning light emitted to the outside via the read window is irradiated on a bar code which is provided on an item or the like. The bar code includes bar portions and space portions which are arranged with a predetermined arrangement that is prescribed by a standard such as the Universal Product Code (UPC), European Article Code (EAC) and Japan Article Numbering (JAN).

The laser scanning light irradiated on the bar code is reflected and is returned via the read window towards a photodiode which converts the returned light into an electrical signal. This electrical signal dependent on the read bar code is decoded and processed in a central processing unit (CPU) and is supplied to a point-of-sales (POS) system or the like.

When reading the bar code by the bar code reader, it is necessary to emit the laser light and rotate the polygonal mirror so as to obtain the laser scanning light. The serviceable life of the laser diode will be shortened if the laser light is emitted even when the bar code is not read. For this reason, the bar code reader is provided with a function of automatically stopping or reducing the light emission quantity of the laser light when not reading the bar code, that is, when not using the laser light.

According to the function of automatically stopping or reducing the light emission quantity of the laser light, the laser light and the motor which rotates the polygonal mirror are controlled by detecting a change in external light and a time for which no bar code label is read.

A description will be given of an example of the control operation of the conventional bar code reader, by referring to a flow chart shown in FIG. 1.

When a power supply of the bar code reader is turned ON, a step S3-1 shown in FIG. 1 rotates a motor which drives a scan means for making a laser light scan. A step S3-2 supplies a current to a laser diode so as to emit the laser light with a normal intensity. When a bar code is read in this state, a read bar code is decoded and the decoded data is transmitted to a POS or the like by steps S3-3 through S3-6.

The step S3-3 decides whether or not the bar code label is detected, and the step S3-4 decodes the read bar code if the decision result in the step S3-3 is YES. The step S3-5 decides whether or not the decoding of the read bar code is completed, and the process returns to the step S3-3 if the decision result in the step S3-5 is NO. On the other hand, if the decision result in the step S3-5 is YES, the step S3-6 transmits the decoded data to the POS or the like, and the process returns to the step S3-3.

If no bar code label is detected and the decision result in the step S3-3 is NO, a step S3-7 decides whether or not the state in which no bar code label is detected lasts for 10 seconds, and the process returns to the step S3-3 if the decision result in the step S3-7 is NO. On the other hand, if the decision result in the step S3-7 is YES, it is judged that the bar code reader is not in frequent use, and a step S3-8 sets the laser light output to 50% the normal output.

A step S3-9 decides whether or not the bar code label is read using the laser light output which is 50% the normal output, and the process returns to the step S3-2 if the decision result in the step S3-9 is YES so as to set the laser light output to 100% the normal output, that is, to emit the laser light with the normal intensity. On the other hand, if the decision result in the step S3-9 is NO, a step S3-10 decides whether or not the state in which no bar code label is detected lasts for 9 minutes and 50 seconds, and the process returns to the step S3-8 if the decision result in the step S3-10 is NO. If the decision result in the step S3-10 is YES, it is judged that the bar code reader is in a halt state, and a step S3-11 turns the laser diode OFF.

After the step S3-11, a step S3-12 decides whether or not the light quantity of external light has decreased by 10%, and the process returns to the step S3-2 if the decision result in the step S3-12 is YES. The external light is blocked and the detected light quantity decreases when reading the bar code. Hence, if the decision result in the step S3-12 is YES, it is judged that the bar code reader is in use and the bar code closely confronts the read window.

On the other hand, if the decision result in the step S3-12 is NO, a step S3-13 decides whether or not the state in which no decrease of the light quantity of the external light by 10% or more lasts for 20 minutes. The process returns to the step S3-12 if the decision result in the step S3-12 is NO. On the other hand, if the decision result in the step S3-13 is YES, it is judged that the bar code reader is in a complete halt, and a step S3-14 stops the motor which drives the polygonal mirror.

Then, a step S3-15 decides whether or not the light quantity of the external light has decreased by 10% after the motor is stopped. The step S3-15 is carried out until the decision result therein becomes YES, and the process returns to the step S3-1 when the decision result in the step S3-15 becomes YES. The laser diode is turned OFF and the motor is maintained in the stopped state while the decrease of the light quantity of the external light in the step S3-15 is less than 10%.

According to the conventional bar code reader, it is judged that an operation is to be made when the light quantity of the external light detected by a sensor decreases by 10% or more. Otherwise, that is, when the decrease of the light quantity of the external light is less than 10%, the laser diode is controlled to emit the laser light at 50% of the normal intensity or to turn OFF and the motor which drives the polygonal mirror is controlled to stop.

However, the conventional bar code reader judges that the bar code is to be read when the light quantity of the external light decreases by 10% or more, regardless of the environment in which the bar code reader is set up. In other words, the external light is detected with a constant sensitivity regardless of the setup environment of the bar code reader, and the judgement which determines whether or not the bar code is to be read is made based on this detection made with the constant sensitivity.

For this reason, if the external light detection sensitivity is set too high, the motor and the laser diode of the bar code reader erroneously resume the operating state in which the bar code is readable even in response to a shadow of a person, when the bar code reader is set up at a location where a large number of people pass and the surrounding light quantity easily changes. On the other hand, if the external light detection sensitivity is set too low, the bar code reader may not operate even when an item closely confronts the read window so as to read the bar code. More particularly, the laser diode may not emit light and the motor which drives the polygonal mirror may not rotate even when the item closely confronts the read window, thereby making it impossible to read the bar code. Therefore, the conventional bar code reader had the above described problems which are caused by the inappropriately set external light detection sensitivity.

SUMMARY OF THE INVENTION

Accordingly, it is a general object of the present invention to provide a novel and useful method of controlling an electronic apparatus and a method of controlling a bar code reader, in which the problems described above are eliminated.

Another and more specific object of the present invention is to provide an electronic apparatus having a plurality of states, comprising detection means for detecting an external light and outputting a detection signal indicative of an intensity of the external light, transition means, responsive to said detection means, for making a state transition from a first state to a second state which is different from the first state and vice versa depending on the detection signal, and varying means, responsive to said transition means, for varying a light detection sensitivity of said detection means depending on the detection signal when the state transition is made by said transition means. According to the electronic apparatus of the present invention, it is possible to stably detect the external light regardless of a change in the environment surrounding the electronic apparatus. In addition, the external light detection sensitivity can be set to an optimum sensitivity depending on the surrounding environment.

Still another object of the present invention is to provide a bar code reader comprising light emitting means for emitting a light when driven, control means for controlling ON/OFF states of the light emitting means, scanning means, including a motor, for generating a scanning light from the light emitted from the light emitting means when the scanning means is driven, so that the scanning light enables scanning of a bar code, detection means for detecting an external light and outputting a detection signal indicative of an intensity of the external light, transition means, responsive to the detection means, for making a state transition from a first state to a second state which is different from the first state and vice versa depending on the detection signal, and varying means, responsive to the transition means, for varying a light detection sensitivity of the detection means depending on the detection signal when the state transition is made by the transition means, where the control means is responsive to the detection means and controls the light emitting means to emit the light at different ON/OFF ratios between the first state and the second state. According to the bar code reader of the present invention, it is possible to prevent an erroneous operation of the electronic apparatus and also reduce the power consumption, thereby making the present invention suited for application to a bar code reader.

A further object of the present invention is to provide a method of controlling an electronic apparatus having a plurality of states, comprising the steps of (a) detecting an external light and generating a detection signal indicative of an intensity of the external light, (b) making a state transition from a first state to a second state which is different from the first state and vice versa responsive to the detection signal, and (c) varying a light detection sensitivity of said step (a) depending on the detection signal when said step (b) makes the state transition. According to the method of the present invention, it is possible to stably detect the external light regardless of a change in the environment surrounding the electronic apparatus. In addition, the external light detection sensitivity can be set to an optimum sensitivity depending on the surrounding environment.

Another object of the present invention is to provide the method described above which further comprises the steps of (d) emitting a light from light emitting means when driven, and (e) generating a scanning light by scanning means including a motor from the light emitted from said light emitting means when said scanning means is driven, so that the scanning light enables scanning of a bar code, where said step (c) reduces the light detection sensitivity of said step (a) by an amount which increases as a time for which the detection signal remains unchanged increases. According to the method of the present invention, it is possible to prevent an erroneous operation of the electronic apparatus and also reduce the power consumption, thereby making the present invention suited for application to a bar code reader.

Other objects and further features of the present invention will be apparent from the following detailed description when read in conjunction with the accompanying drawings.

BRIEF DESCRIPTION OF THE DRAWINGS

FIG. 6 is a diagram for explaining the operation of the second embodiment of the electronic apparatus.

DESCRIPTION OF THE PREFERRED EMBODIMENTS

Figure 1:
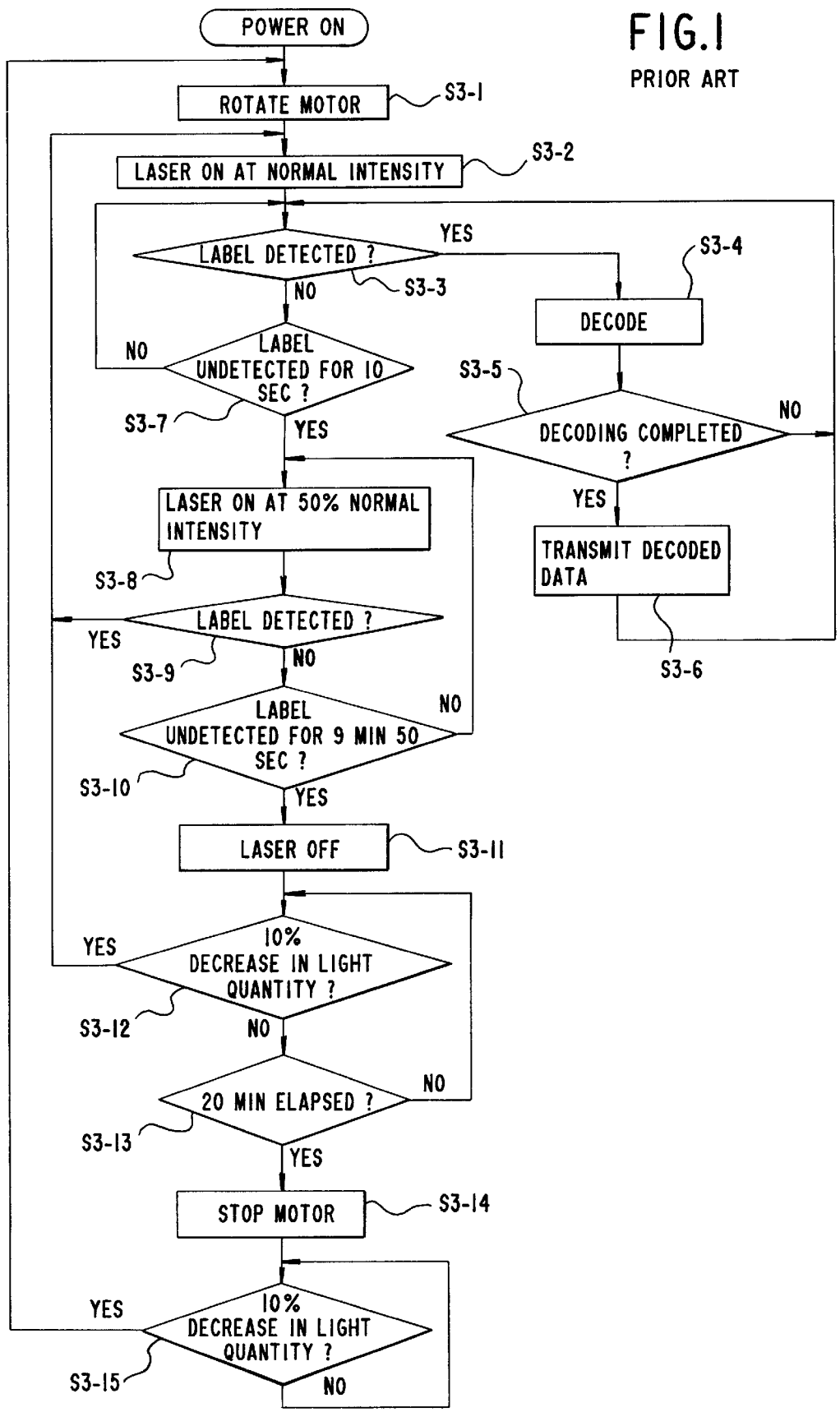
FIG. 1 is a flow chart for explaining a control operation of an example of a conventional bar code reader.
Figure 2:
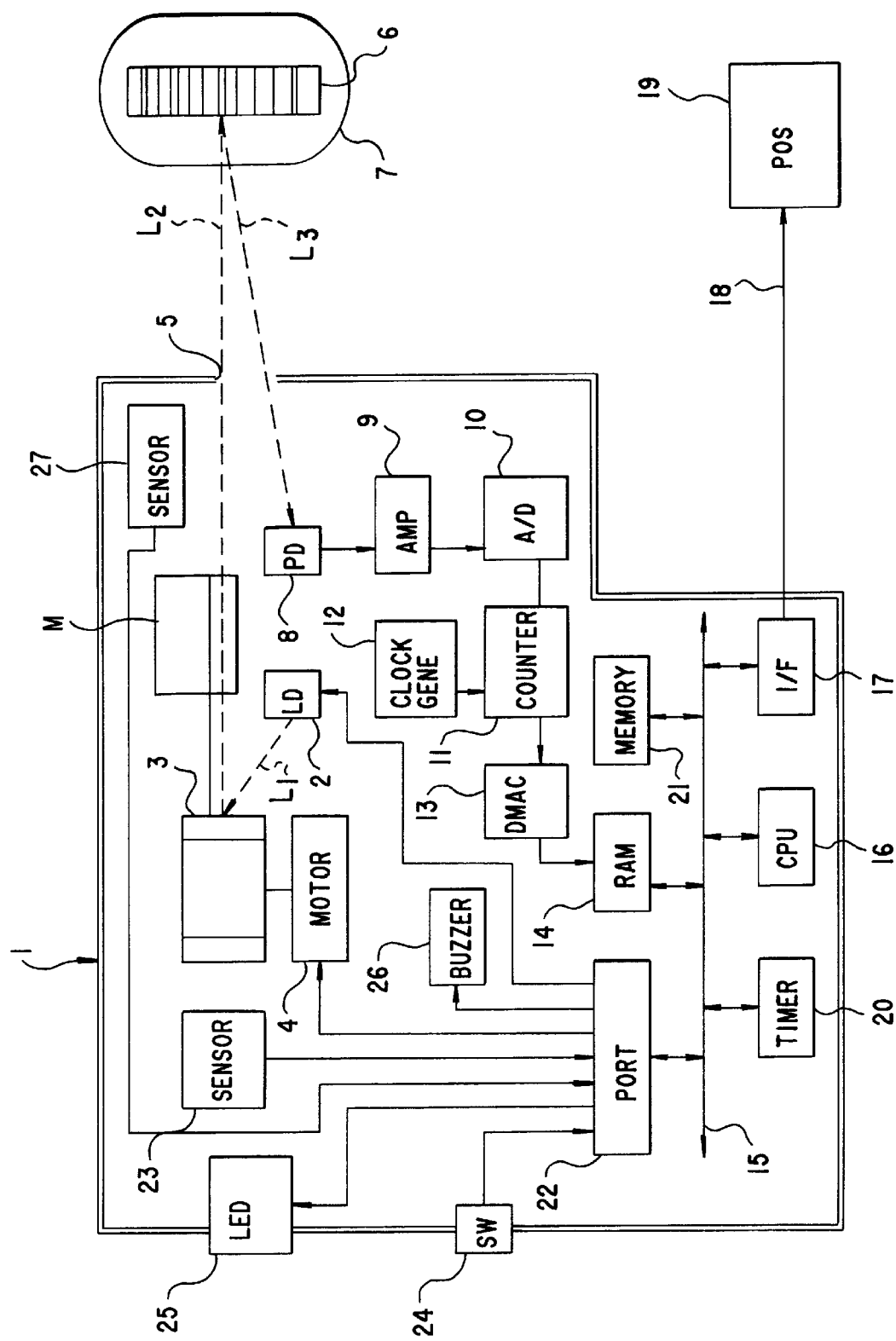
FIG. 2 is a system block diagram showing the general construction of a first embodiment of an electronic apparatus according to the present invention.

FIG. 2 is a system block diagram showing the general construction of a first embodiment of an electronic apparatus according to the present invention. In this embodiment of the electronic apparatus, the present invention is applied to a bar code reader. In addition, this embodiment of the electronic apparatus employs a first embodiment of a method of controlling the electronic apparatus according to the present invention. A laser type bar code reader 1 irradiates a laser scanning light on a bar code, and reads the bar code by detecting a reflected light from the bar code.

In this bar code reader 1, a laser diode 2 emits a laser light $L_1$, and this laser light $L_1$ is irradiated on a polygonal mirror 3. The polygonal mirror 3 is rotated by a motor 4, and a reflected laser light from the polygonal mirror 3 scans in a plurality of directions. The reflected laser light, that is, a laser scanning light $L_2$, is emitted to the outside via an optical system M and a read window 5.

The laser scanning light $L_2$ emitted to the outside via the read window 5 is irradiated on a bar code 6 which is provided on an item 7. The bar code 6 includes bar portions and space portions which are arranged with a predetermined arrangement that is prescribed by a standard such as the UPC, EAC and JAN.

The laser scanning light $L_2$ irradiated on the bar code 6 is reflected and a reflected light $L_3$ is returned via the read window 5 towards a photodiode 8 which generates a photocurrent depending on the returned reflected light $L_3$. This photocurrent is amplified in an amplifier 9.

An amplified signal from the amplifier 9 is supplied to an analog-to-digital (A/D) converter 10. The A/D converter 10 compares the amplified signal with a reference level, and converts the amplified signal into a pulse signal which has a high level when the amplified signal is greater than or equal to the reference level and has a low level when the amplified signal is smaller than the reference level. This pulse signal is supplied to a bar width counter 11 which also receives a clock from a clock generating circuit 12.

The bar width counter 11 counts the clock from the clock generating circuit 12 during the high and low levels of the pulse signal from the A/D converter 10, and outputs a counted value corresponding to the duration of the high level period of the pulse signal and a counted value corresponding to the duration of the low level period of the pulse signal. The counted values from the bar width counter 11 are stored in a random access memory (RAM) 14 via a direct memory access controller (DMAC) 13.

The RAM 14 is coupled to a central processing unit (CPU) 16 via a bus 15. The stored counted values which are dependent on the pattern of the read bar code 6 are read from the RAM 14 and supplied to the CPU 16 which carries out a recognition process which will be described later to recognize the read bar code 6. The recognized bar code 6 is supplied to a POS system 19 via an interface circuit 17 and an interface cable 18.

A timer 20, a memory 21 such as a non-volatile memory which stores data to be read, and an input/output port 22 are coupled to the bus 15 in addition to the RAM 14, the CPU 16 and the interface circuit 17. As will be described later, the CPU 16 controls the recognition process which recognizes the bar code 6 by signals supplied to the timer 20, the memory 21 and the input/output port 22.

A rotation sensor 23 for detecting a rotary position of the polygonal mirror 3, a switch 24 for recognizing a manual operation, a light emitting diode (LED) 25 for displaying a state of the recognized operation, a buzzer 26 for notifying whether or not the code recognition was successful, and an external light sensor 27 for detecting the brightness of the environment surrounding the bar code reader 1 are coupled to the input/output port 22. The laser diode 2, the motor 4, the LED 25, the buzzer 26 and the like are controlled via the port 22 depending on the operation of the CPU 16 which controls the recognition process.

In this embodiment, it is assumed for the sake of convenience that the bar code reader 1 can make a transition between two states A and B, excluding of course a state in which the bar code reader 1 is completely turned OFF. In the state A, the laser diode 2 emits the laser light at 100% the normal intensity, the motor 4 rotates the polygonal mirror 3, and the bar code 6 is readable. On the other hand, in the state B, the laser diode 2 emits the laser light at 100% the normal intensity but so that the ON/OFF ratio of the laser diode 2 is 50%.

Figure 3:
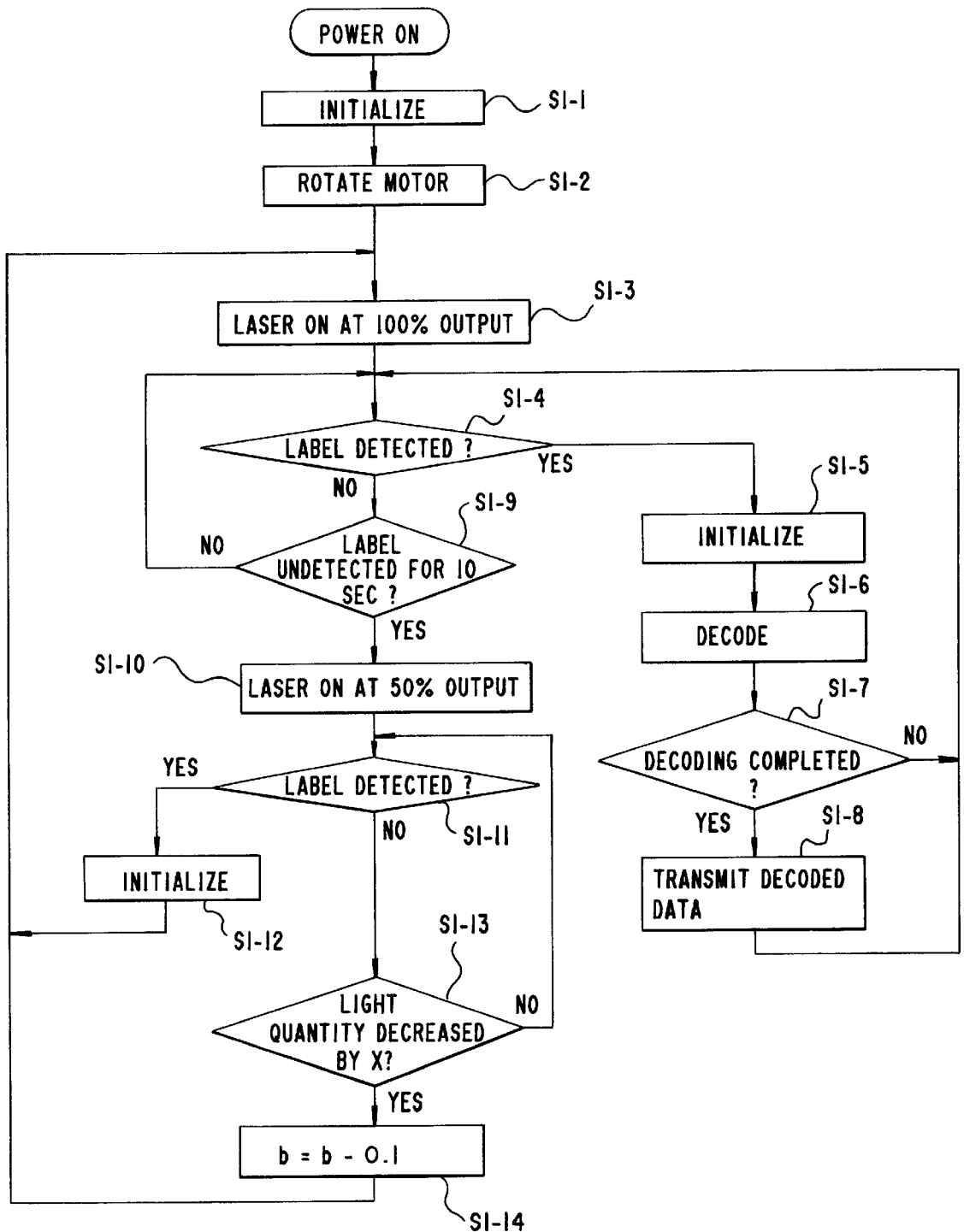
FIG. 3 is a flow chart for explaining the operation of the first embodiment of the electronic apparatus.

FIG. 3 is a flow chart for explaining the operation of the first embodiment, that is, the operation of the CPU 16.

When a power supply of the bar code reader 1 is turned ON, a step S1-1 initializes a constant value which determines a detection range for the external light. In this embodiment, a constant value is set for each state of the bar code reader 1. A constant value b is used to determine the external light detection range in the state B in which the motor 4 rotates the polygonal mirror 3 and the ON/OFF ratio of the laser diode 2 is 50% that of the state A, and for example, this constant value b is set to an initial value $b_0$ of 0.9 in the step S1-1. It is also possible to set a constant value a for determining the external light detection range in the state A to an initial value $a_0$ in the step S1-1 if necessary.

Next, a step S1-2 rotates the motor 4 so as to generate the laser scanning light, samples a signal received from the external light sensor 27 at a predetermined sampling period, and calculates an average value of the sampled signals. A step S1-3 supplies a current to the laser diode 2, so that the laser diode 2 emits a laser light with a normal intensity (100%).

By the steps S1-1 through S1-3 described above, the motor 4 which rotates the polygonal mirror 3 rotates, and the laser diode 2 emits the laser light with the normal intensity to enable a normal read, thereby making it possible for the bar code reader 1 to read the bar code 6.

When the bar code 6 is read in this state, a step S1-4 decides whether or not the bar code label is detected, and a step S1-5 initializes the constant value b for setting the external light detection range to the initial value $b_0$ if the decision result in the step S1-4 is YES. The step S1-4 detects the bar code label when at least a block on one side of blocks forming the bar code 6 is detected. A step S1-6 decodes the read bar code label, and a step S1-7 decides whether or not the decoding is completed. The process returns to the step S1-4 if the decision result in the step S1-7 is NO. On the other hand, if the decision result in the step S1-7 is YES, a step S1-8 transmits the decoded data to the POS system 19 via the interface circuit 17 and the interface cable 18, and the process returns to the step S1-4.

The constant value b is always initialized in the step S1-5 while the bar code label is detected in the step S1-4. For this reason, the constant value b is fixed to the initial value $b_0$ of 0.9, for example.

On the other hand, if the decision result in the step S1-4 is NO, a step S1-9 decides whether or not no bar code label is detected for 10 seconds. The process returns to the step S1-4 if the decision result in the step S1-9 is NO. If the decision result in the step S1-9 is YES, a step S1-10 controls the laser diode 2 so that the laser light is emitted at 100% the normal intensity but with the ON/OFF ratio of 50% so that the total output is 50% the normal total output.

A step S1-11 decides whether or not the bar code label is detected in the state where the total output of the laser diode 2 is set to 50% the normal total output. If the decision result in the step S1-11 is YES, a step S1-12 initializes the constant value, and the process returns to the step S1-3. In this case, the step S1-12 returns the constant value b to the initial value $b_0$ of 0.9, and the process returns to the step S1-3 so that the bar code reader 1 makes a state transition to the state A in which the laser light is emitted with the normal total output.

On the other hand, if the decision result in the step S1-11 is NO, a step S1-13 decides whether or not the external light quantity detected by the external light sensor 27 has decreased by a predetermined amount (X) or more. More particularly, the step S1-13 obtains a slice level by multiplying the constant value b by an average value of 9 past external light quantities which are detected by the external light sensor 27 and sampled for every 100 ms, and decides whether or not the present external light quantity detected by the external light sensor 27 is less than this slice level. The process returns to the step S1-11 and the state B of the bar code reader 1 is maintained if the decision result in the step S1-13 is NO. On the other hand, if the decision result in the step S1-13 is YES, a step S1-14 changes the external light detection sensitivity, and the process returns to the step S1-3.

More particularly, the step S1-14 changes the constant value b by setting the constant value b to b−0.1. For example, when the initial value $b_0$ of the constant value b is 0.9, the step S1-14 sets the constant value b to $b_0$−0.1=0.9−0.1=0.8. When setting the constant value b in the step S1-14, the lower limit value of the constant value b is set to 0.5.

In other words, when the bar code 6 is not read and the bar code reader 1 changes from the state B in which the total output of the laser diode 2 is 50% to the state A in which the total output of the laser diode 2 is 100%, depending solely on the external light, the constant value b undergoes a change 0.9→0.8→0.7→0.6→0.5 every time the bar code reader 1 makes a transition from the state B to the state A.

Figure 4:
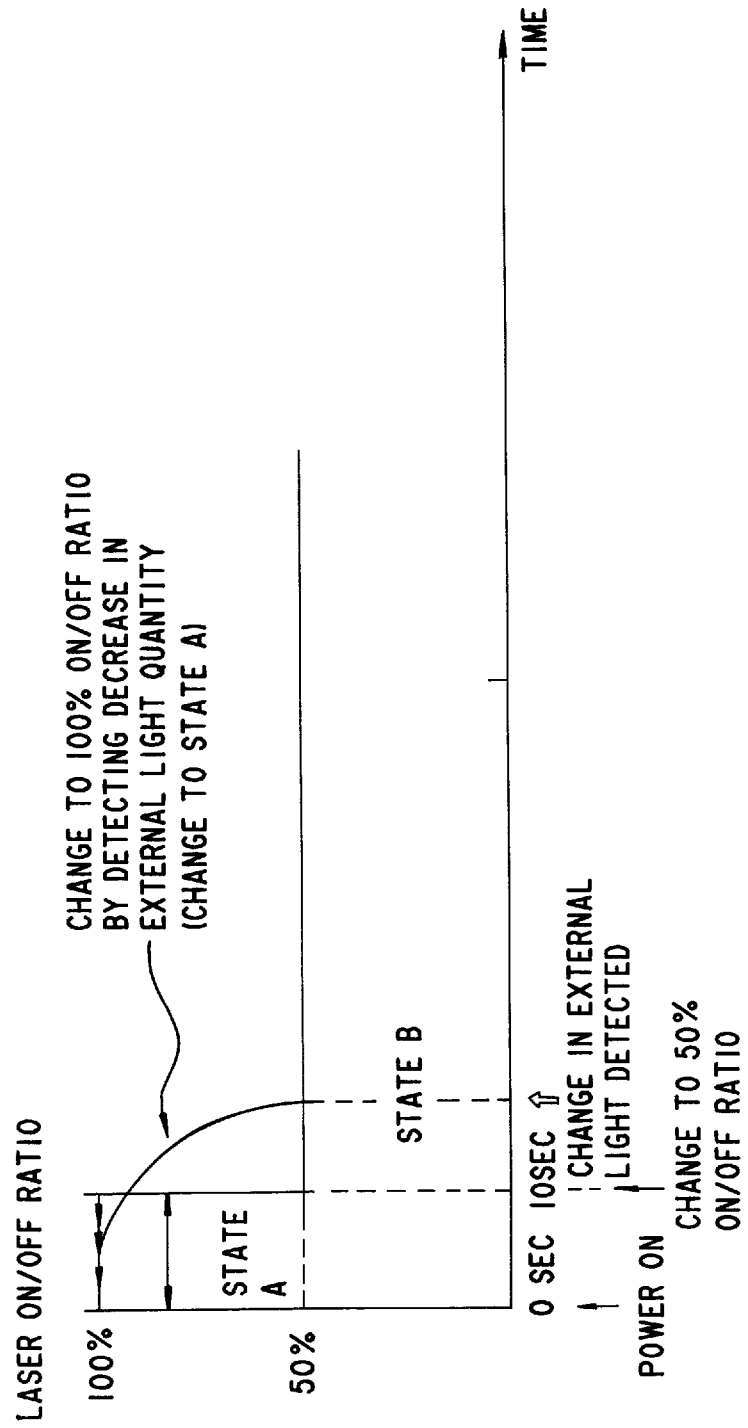
FIG. 4 is a diagram for explaining the operation of the first embodiment of the electronic apparatus.

FIG. 4 is a diagram for explaining the operation of the first embodiment. First, when the bar code label is not detected for 10 seconds in the state A in which the total output of the laser diode 2 is 100% and the motor 4 rotates the polygonal mirror 3, the bar code reader 1 makes a state transition from the state A to the state B in which the ON/OFF ratio of the laser diode 2 is 50%. In this state B, when no bar code label is detected and the external light quantity becomes less than the slice level described above, it is judged that an erroneous detection is made and the constant value b is changed to b−0.1, so as to decrease the external light detection level and to reduce the external light detection sensitivity.

According to this embodiment, the external light detection sensitivity is reduced when the detected external light quantity decreases even though the bar code 6 is not read. Hence, the external light detection sensitivity is reduced when the light quantity of the environment surrounding the bar code reader 1 greatly changes even though the bar code 6 is not read. As a result, the laser diode 2 is prevented from being unnecessarily turned ON except when reading the bar code 6, and it is thus possible to extend the serviceable life of the laser diode 2 and to reduce the power consumption.

In this embodiment, it was described that the bar code reader 1 makes a state transition between the states A and B depending on the external light quantity, and that the constant value b which determines the level at which a state transition is to be made is varied. However, it is of course possible for the bar code reader 1 to make transitions among three or more states. In this case, the constant value may be set for each state and varied.

Next, a description will be given of a second embodiment of the electronic apparatus according to the present invention. In this embodiment of the electronic apparatus, the present invention is applied to the bar code reader. In addition, this embodiment of the electronic apparatus employs a second embodiment of the method of controlling the electronic apparatus according to the present invention. The general construction of this second embodiment is the same as that shown in FIG. 2, and this second embodiment will be described with reference to FIG. 2.

In this embodiment, the bar code reader 1 makes state transitions among states A, B, C and D. In the state A, the laser diode 2 emits the laser light at 100% the normal intensity, the polygonal mirror 3 is rotated by the motor 4, and it is possible to read the bar code 6. In the state B, the laser diode 2 emits the laser light at 100% the normal intensity but the ON/OFF ratio of the laser diode 2 is 50%. In the state C, the laser diode 2 is turned OFF, but the motor 4 rotates the polygonal mirror 3. Further, in the state D, the laser diode 2 is turned OFF, and the motor 4 is stopped.

Figure 5:
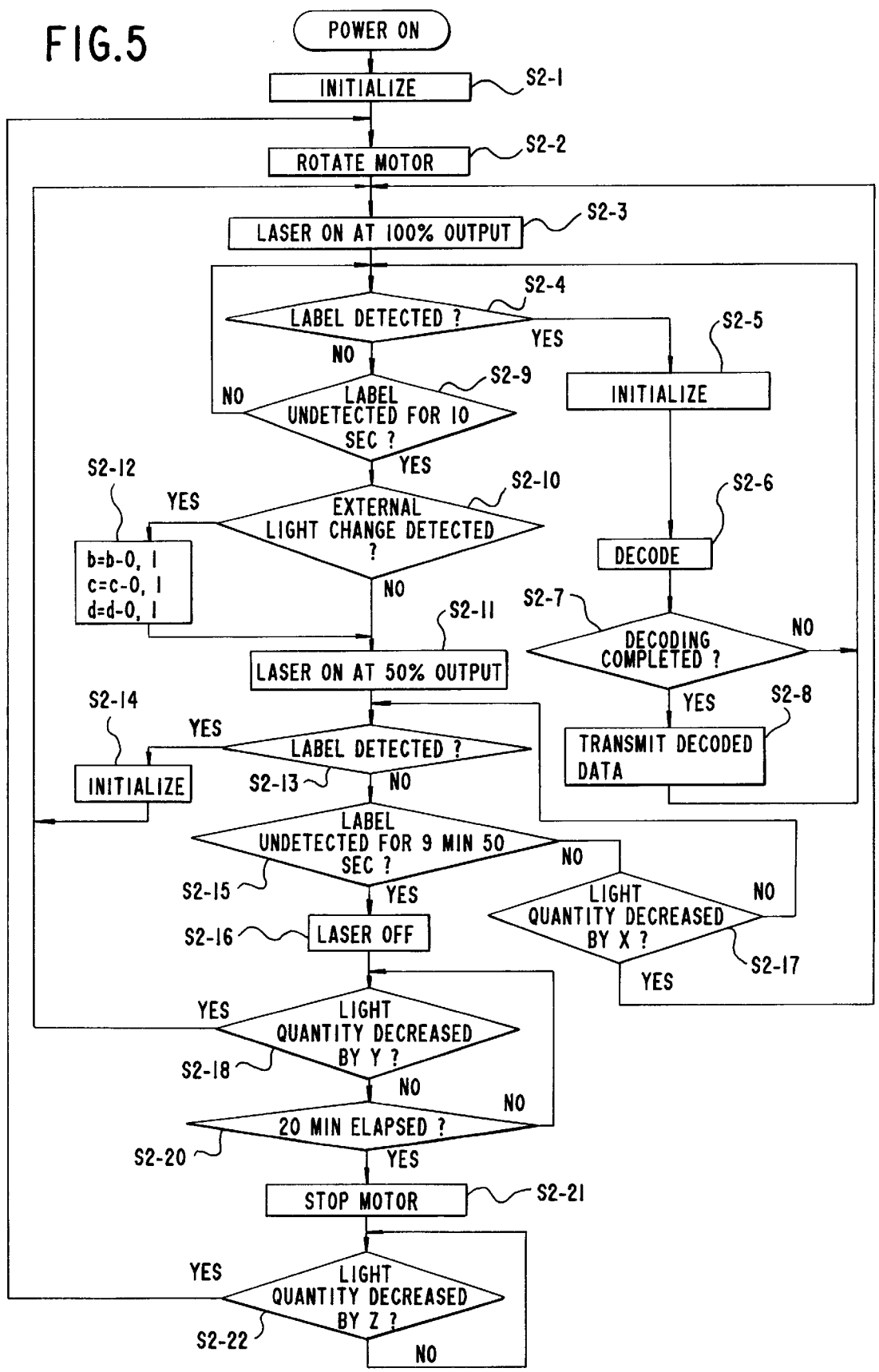
FIG. 5 is a flow chart for explaining the operation of a second embodiment of the electronic apparatus according to the present invention.

FIG. 5 is a flow chart for explaining the operation of the second embodiment, that is, the operation of the CPU 16.

When the power supply of the bar code reader 1 is turned ON, a step S2-1 initializes a constant value which determines the detection range for the external light. In this embodiment, the constant value is set for each state of the bar code reader 1. A constant value b is used to determine the external light detection range in the state B, and for example, this constant value b is set to an initial value $b_0$ of 0.9 in the step S2-1. In addition, the step S2-1 sets a constant value c which determines the external light detection range in the state C to an initial value $c_0$ of 0.8, and sets a constant value d which determines the external light detection range in the state D to an initial value $d_0$ of 0.7, for example. It is also possible to set a constant value a for determining the external light detection range in the state A to an initial value $a_0$ in the step S1-1 if necessary.

Next, a step S2-2 rotates the motor 4 so as to generate the laser scanning light. A step S2-3 supplies a current to the laser diode 2, so that the laser diode 2 emits the laser light at 100% the normal intensity.

By the steps S2-1 through S2-3 described above, the motor 4 which rotates the polygonal mirror 3 rotates, and the laser diode 2 emits the laser light with the normal intensity to enable a normal read, thereby making it possible for the bar code reader 1 to read the bar code 6.

When the bar code 6 is read in this state, a step S2-4 decides whether or not the bar code label is detected, and a step S2-5 initializes the constant values b, c and d for setting the external light detection range to the corresponding initial value $b_0$, $c_0$ and $d_0$ if the decision result in the step S2-4 is YES. The step S2-4 detects the bar code label when at least a block on one side of blocks forming the bar code 6 is detected. A step S2-6 decodes the read bar code label, and a step S2-7 decides whether or not the decoding is completed. The process returns to the step S2-4 if the decision result in the step S2-7 is NO. On the other hand, if the decision result in the step S2-7 is YES, a step S2-8 transmits the decoded data to the POS system 19 via the interface circuit 17 and the interface cable 18, and the process returns to the step S2-4.

The constant values b, c and d are always initialized in the step S2-5 while the bar code label is detected in the step S2-4. For this reason, the constant values b, c and d are fixed to the corresponding initial value $b_0$ of 0.9, initial value $c_0$ of 0.8 and initial value $d_0$ of 0.7, for example.

On the other hand, if the decision result in the step S2-4 is NO, a step S2-9 decides whether or not no bar code label is detected for 10 seconds in the state A. The process returns to the step S2-4 if the decision result in the step S2-9 is NO. If the decision result in the step S2-9 is YES, a step S2-10 decides whether or not a change is detected in the external light quantity detected by the external light sensor 27.

If decision result in the step S2-10 is NO, a step S2-11 controls the laser diode 2 so that the laser light is emitted at 100% the normal intensity but with the ON/OFF ratio of 50% so that the total output is 50% the normal total output. But if the decision result in the step S2-10 is YES, a step S2-12 sets the constant values b, c and d to b−0.1, c−0.1 and d−0.1, respectively, and the process advances to the step S2-11.

For example, when the constant values b, c and d are set to the corresponding initial value $b_0$ of 0.9, initial value $c_0$ of 0.8 and initial value $c_0$ of 0.7, the step S2-12 sets the constant values b, c and d as follows.

$$b=(b_0-0.1)=(0.9-0.1)=0.8$$

$$c=(c_0-0.1)=(0.8-0.1)=0.7$$

$$b=(d_0-0.1)=(0.7-0.1)=0.6$$

The lower limit value of the constant values b, c and d is set to 0.5.

A step S2-13 decides whether or not the bar code label is detected in the state where the total output of the laser diode 2 is set to 50% the normal total output. If the decision result in the step S2-13 is YES, a step S2-14 initializes the constant values b, c and d to the corresponding initial values $b_0$, $c_0$ and $c_0$, and the process returns to the step S2-3. In this case, the step S2-14 returns the constant values b, c and d to the corresponding initial value $b_0$ of 0.9, initial value $c_0$ of 0.8 and initial value $c_0$ of 0.7, and the process returns to the step S2-3 so that the bar code reader 1 makes a state transition to the state A in which the laser light is emitted with the normal total output.

On the other hand, if the decision result in the step S2-13 is NO, a step S2-13 decides whether or not no bar code label is detected in the state B for 9 minutes and 50 seconds. If the decision result in the step S3-15 is NO, a step S2-17 decides whether or not the external light quantity detected by the external light sensor 27 has decreased by a predetermined amount (X) or more. More particularly, the step S2-17 obtains a first slice level by multiplying the constant value b by an average value of 9 past external light quantities which are detected by the external light sensor 27 and sampled for every 100 ms, and decides whether or not the present external light quantity detected by the external light sensor 27 is less than this first slice level. The process returns to the step S2-13 and the state B of the bar code reader 1 is maintained if the decision result in the step S2-17 is NO. On the other hand, if the decision result in the step S2-17 is YES, it is judged that the read window 5 closely confronts the bar code 6, and the process returns to the step S2-3 so as to put the bar code reader 1 to the state A.

On the other hand, if the decision result in the step S2-15 is YES, it is judged that the bar code reader 1 is in the state C, and a step S2-16 turns the laser diode 2 OFF. Then, a step S2-18 decides whether or not the external light quantity detected by the external light sensor 27 has decreased by a predetermined amount (Y) or more. More particularly, the step S2-18 obtains a second slice level by multiplying the constant value c by an average value of 9 past external light quantities which are detected by the external light sensor 27 and sampled for every 100 ms, and decides whether or not the present external light quantity detected by the external light sensor 27 is less than this second slice level. The process advances to a step S2-20 and the state C of the bar code reader 1 is maintained if the decision result in the step S2-18 is NO. On the other hand, if the decision result in the step S2-18 is YES, it is judged that the read window 5 closely confronts the bar code 6, and the process returns to the step S2-3 so as to put the bar code reader 1 to the state A.

The step S2-20 decides whether or not 20 minutes has elapsed from the time when the laser diode 2 is turned OFF, and the process returns to the step S2-18 if the decision result in the step S2-20 is NO. In this case, the step S2-18 makes the decision for every 10 ms. On the other hand, if the decision result in the step S2-20 is YES, a step S2-21 stops the motor 4 so as to put the bar code reader 1 to the state D.

Then, a step S2-22 decides whether or not the external light quantity detected by the external light sensor 27 has decreased by a predetermined amount (Z) or more. More particularly, the step S2-22 obtains a third slice level by multiplying the constant value d by an average value of 9 past external light quantities which are detected by the external light sensor 27 and sampled for every 100 ms, and decides whether or not the present external light quantity detected by the external light sensor 27 is less than this third slice level. The state D of the bar code reader 1 is maintained and the step S2-22 makes the decision for every 10 ms until the decision result in the step S2-22 becomes YES. On the other hand, if the decision result in the step S2-22 becomes YES, it is judged that the read window 5 closely confronts the bar code 6, and the process returns to the step S2-2 so as to rotate the motor 4 and to put the bar code reader 1 to the state A.

FIG. 6 is a diagram for explaining the operation of this second embodiment. As shown in FIG. 6, when no bar code label is detected for 10 seconds in the state A in which the laser diode 2 emits the laser light at 100% the normal intensity and the motor 4 rotates the polygonal mirror 3, the bar code reader 1 makes a state transition to the state B in which the ON/OFF ratio of the laser diode 2 is set to 50% that of the state A. As the state transition is made from the state A to the state B, 0.1 is subtracted from each of the constant values b, c and d which determine the external light detection range, thereby decreasing the external light detection level and reducing the external light detection sensitivity.

When no bar code label is detected for 9 minutes and 50 seconds in the state B, that is, when no bar code label is detected for 10 minutes from the time when the bar code reader 1 assumes the state A, a state transition is made from the state B to the state C in which the laser diode 2 is turned OFF.

Further, when no bar code label is detected for 20 minutes in the state C, that is, when no bar code label is detected for 30 minutes from the time when the bar code reader 1 assumes the state A, a state transition is made from the state C to the state D in which the laser diode 2 is turned OFF and the motor 4 is stopped. In this state D, the constant value d takes a small value compared to the constant values b and c, and the external light detection sensitivity accordingly becomes a minimum.

When the detected external light quantity becomes less than the first slice level in the state B, less than the second slice level in the state C or less than the third slide level in the state D, the state of the bar code reader 1 is returned to the state A. If the bar code label is not detected thereafter in this state A, 0.1 is subtracted from the constant values b, c and d so as to reduce the external light detection sensitivity.

In other words, when the bar code 6 is not read but the decrease of the external light quantity is detected, the constant value b undergoes a change $0.9 \rightarrow 0.8 \rightarrow 0.7 \rightarrow 0.6 \rightarrow 0.5$ every time the decrease of the external light quantity is detected, the constant value c undergoes a change $0.8 \rightarrow 0.7 \rightarrow 0.6 \rightarrow 0.5$ every time the decrease of the external light quantity is detected, and the constant value d undergoes a change $0.7 \rightarrow 0.6 \rightarrow 0.5$ every time the decrease of the external light quantity is detected.

The laser diode 2 is turned OFF in the states C and D. Hence, no bar code label is detected in the states C and D, and it is judged that the bar code 6 is to be read when the external light quantity decreases. In this case, the external light detection sensitivity becomes lower as the time for which no bar code 6 is read becomes longer. As a result, when the bar code reader 1 does not read the bar code 6 for a long time, the bar code reader 1 is made less sensitive to the change in the external light, so that the laser diode 2 and the motor 4 will not easily be driven in response to a change in the external light. In other words, it is possible to reduce erroneous operation of the bar code reader 1.

According to this embodiment, the external light detection sensitivity is reduced when the detected external light quantity decreases even though the bar code 6 is not read. Hence, the external light detection sensitivity is reduced when the light quantity of the environment surrounding the bar code reader 1 greatly changes even though the bar code 6 is not read. As a result, the laser diode 2 and the motor 4 are prevented from being unnecessarily turned ON except when reading the bar code 6, and it is thus possible to extend the serviceable life of the laser diode 2 and to reduce the power consumption.

Further, the present invention is not limited to these embodiments, but various variations and modifications may be made without departing from the scope of the present invention.

What is claimed is:

1. A bar code reader comprising:

light emitting means for emitting a light when driven;

control means for controlling ON/OFF states of said light emitting means;

scanning means, including a motor, for generating a scanning light from the light emitted from said light emitting means when said scanning means is driven, so that the scanning light enables scanning of a bar code;

detection means for detecting an external light and outputting a detection signal indicative of an intensity of the external light;

transition means, responsive to said detection means, for making a state transition from a first state to a second state which is different from the first state and vice versa depending on the detection signal; and varying means, responsive to said transition means, for varying a light detection sensitivity of said detection means depending on the detection signal when the state transition is made by said transition means, said control means being responsive to said detection means and controlling said light emitting means to emit the light at different ON/OFF ratios between the first state and the second state.

2. The bar code reader as claimed in claim 1, wherein said varying means reduces the light detection sensitivity of said detection means by an amount which increases as a time in which the detection signal remains unchanged increases.

3. The bar code reader as claimed in claim 2, wherein:

said control means controls said light emitting means to produce a normal output in said first state and to produce an output which is reduced compared to the normal output in said second state; and said varying means reduces the light detection sensitivity of said detection means when the state transition is made from the second state to the first state.

4. The bar code reader as claimed in claim 3, wherein:

said light emitting means is turned OFF and said scanning means is driven in a third state;

said light emitting means and said scanning means are turned OFF in a fourth state; and said varying means reduces the light detection sensitivity of said detection means when the state transition is made from any one of said second through fourth states to said first state.

5. The bar code reader as claimed in claim 2, wherein said transition means comprises:

setting means for setting a light detection level of said detection means by multiplying a constant value by a reference value of the detection signal;

sampling means for sampling the detection signal at a predetermined sampling period;

judging means for judging whether or not the detected intensity of the external light is less than the set detection level by comparing the detection signal and the detection level; and means for making the state transition from the first state to the second state depending on a judgement result of said judging means, said varying means varying the constant value used by said setting means when the state transition is made.

6. The bar code reader as claimed in claim 5, wherein said setting means obtains the reference value of the detection signal by averaging the detection signal received from said detection means during a predetermined time.

7. The bar code reader as claimed in claim 5, wherein said varying means varies the constant value every time a state transition is made.

* * * * *